United States Patent
Fujii et al.

(10) Patent No.: US 8,363,720 B2
(45) Date of Patent: Jan. 29, 2013

(54) MOVING IMAGE PROCESSING DEVICE, MOVING IMAGE PROCESSING METHOD AND IMAGING APPARATUS

(75) Inventors: Syouzou Fujii, Osaka (JP); Hidemi Oka, Hyogo (JP)

(73) Assignee: Panasonic Corporation, Osaka (JP)

( * ) Notice: Subject to any disclaimer, the term of this patent is extended or adjusted under 35 U.S.C. 154(b) by 344 days.

(21) Appl. No.: 12/693,110

(22) Filed: Jan. 25, 2010

(65) Prior Publication Data

US 2010/0189175 A1    Jul. 29, 2010

(30) Foreign Application Priority Data

Jan. 26, 2009    (JP) .................................. 2009-014005

(51) Int. Cl.
*H04N 7/30* (2006.01)
(52) U.S. Cl. ............................... 375/240.03; 375/240.02
(58) Field of Classification Search ............. 375/240.02, 375/240.03
See application file for complete search history.

(56) References Cited

U.S. PATENT DOCUMENTS

| 5,815,601 A * | 9/1998 | Katata et al. ................... 382/232 |
| 2009/0122164 A1* | 5/2009 | Maki et al. ............... 348/240.99 |
| 2009/0232203 A1* | 9/2009 | Jayant et al. ............. 375/240.02 |

FOREIGN PATENT DOCUMENTS

JP    2005-109606 A    4/2005

* cited by examiner

*Primary Examiner* — Sath V Perungavoor
*Assistant Examiner* — Jeffery Williams
(74) *Attorney, Agent, or Firm* — Hamre, Schumann, Mueller & Larson, P.C.

(57) ABSTRACT

A moving image processing device (200) includes a face detector (3) (specific target detector), a compression ratio controller (4), and a quantizer (9) (video compressor). The face detector (3) detects a person's face included in an input image and extracts a face region. The compression ratio controller (4) generates and outputs a compression control instruction for reducing the compression ratio of the face region extracted by the face detector (3) so that a degree of reduction in the compression ratio of the face region is small in the case where the ratio of the area of the face region to the entire area of the input image is relatively large and so that the degree of reduction in the compression ratio of the face region large in the case where the ratio of the area of the face region to the entire area of the input image is relatively small. The quantizer (9) performs a quantization processing of the face region according to the compression control instruction given from the compression ratio controller (4).

14 Claims, 17 Drawing Sheets

FIG.9

Face protection map

Face protection region

| 0 | 0 | 0 | 0 | 0 | 0 | 0 | 0 | 0 | 0 | 0 | 0 | 0 | 0 |
|---|---|---|---|---|---|---|---|---|---|---|---|---|---|
| 0 | 0 | 0 | 0 | 1 | 1 | 1 | 1 | 1 | 1 | 1 | 1 | 0 | 0 |
| 0 | 0 | 0 | 0 | 1 | 1 | 1 | 1 | 1 | 1 | 1 | 1 | 0 | 0 |
| 0 | 1 | 1 | 1 | 1 | 1 | 1 | 1 | 1 | 1 | 1 | 1 | 0 | 0 |
| 0 | 1 | 1 | 1 | 1 | 1 | 1 | 1 | 1 | 1 | 1 | 1 | 0 | 0 |
| 0 | 1 | 1 | 1 | 1 | 1 | 1 | 1 | 1 | 1 | 1 | 1 | 0 | 0 |
| 0 | 1 | 1 | 1 | 1 | 1 | 1 | 1 | 1 | 1 | 1 | 1 | 0 | 0 |
| 0 | 1 | 1 | 1 | 1 | 1 | 1 | 1 | 1 | 1 | 1 | 1 | 0 | 0 |
| 0 | 1 | 1 | 1 | 1 | 1 | 1 | 1 | 1 | 1 | 1 | 1 | 0 | 0 |

FIG.11

Face protection map

Face protection region of face A

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 6 | 6 | 6 | 6 | 6 | 6 | 0 | 0 | 0 |
| 0 | 0 | 0 | 0 | 0 | 0 | 6 | 6 | 6 | 6 | 6 | 6 | 0 | 0 | 0 |
| 0 | 0 | 0 | 0 | 0 | 0 | 6 | 6 | 6 | 6 | 6 | 6 | 0 | 0 | 0 |
| 0 | 0 | 0 | 0 | 9 | 9 | 9 | 6 | 6 | 6 | 6 | 6 | 0 | 0 | 0 |
| 0 | 0 | 0 | 0 | 9 | 9 | 9 | 6 | 6 | 6 | 6 | 6 | 0 | 0 | 0 |
| 0 | 0 | 0 | 0 | 9 | 9 | 9 | 6 | 6 | 6 | 6 | 6 | 0 | 0 | 0 |
| 0 | 0 | 0 | 0 | 0 | 0 | 6 | 6 | 6 | 6 | 6 | 6 | 0 | 0 | 0 |
| 0 | 0 | 0 | 0 | 0 | 0 | 0 | 0 | 0 | 0 | 0 | 0 | 0 | 0 | 0 |

Face protection region of face B

MOVING IMAGE PROCESSING DEVICE, MOVING IMAGE PROCESSING METHOD AND IMAGING APPARATUS

BACKGROUND OF THE INVENTION

1. Field of the Invention

The present invention relates to a moving image processing device for compressing video images.

2. Description of Related Art

In recent years, highly efficient video compression techniques, such as MPEG-2 (ITU-T H.262) and H.264/MPEG-4 AVC standards, have made significant progress. These video compression techniques are used in the field of video cameras and recorders. In these fields, various techniques have been developed to achieve better image quality at lower bit rates. In these techniques, a low compression ratio is set for a viewer's attention region in an input image to improve the image quality while a higher compression ratio is set for the other region to reduce the bit rate. Various ways to compress images while protecting the portion of a person's face in particular as an attention region have been studied and proposed actively. In these techniques, a person's face is detected based on its characteristic color information and average luminance. These techniques, however, have a problem in that the region other than the face portion is misidentified as an attention region and protected if it has the same characteristics as those of the face portion.

On the other hand, face object detection techniques have been developed as new approaches. In these techniques, a person's face is regarded as an object, and the face is detected based on the components of the face such as eyes, a nose, and a mouth and the positional relationship between these components. These techniques have been used for auto-focusing and exposure control of optical systems in the fields of video cameras and still cameras. In these face object detection techniques, faces are detected with a high degree of accuracy. These techniques also are expected to be extended to face authentication techniques to identify a particular person. In view of this, proposals are beginning to be made to combine these face object detection techniques with the existing video compression techniques to obtain moving image processing devices for compressing persons' face portions with a high degree of accuracy while maintaining high image quality. A typical example of these devices is disclosed in JP 2005-109606 A. The basic configuration of this device as a conventional one is described below.

FIG. 13 shows a configuration of a conventional moving image processing device. Hereinafter, the operation of the conventional moving image processing device performed in the case where input image data includes a person's face is described. The conventional moving image processing device includes a video compressor 100, an image memory 101, and a face object detector 102.

Input image data to be compressed is given to the video compressor 100 and the image memory 101. Upon receiving the input image data from the image memory 101, the face object detector 102 starts a face object detection processing. Specifically, the face object detector 102 regards the portion of a person's face included in the input image data as an object, and detects the person's face based on the characteristic components of the face such as eyes, a nose, and a mouth and the positional relationship between these components. Then, it removes the background to extract and identify the face region, and outputs face detection information. FIG. 14 is a diagram showing conventional face detection information, and indicates that a face portion in input image data is detected properly.

A quantizer 103 receives the face detection information from the face object detector 102 at a point of time when a DCT (discrete cosine transformer) 108 starts processing one frame of data. In the quantization processing following the DCT, the face detection information is used to reduce the compression ratio of the face portion to a lower level than that of the other portion. JP 2005-109606 A, however, proposes neither a specific method nor detailed technique therefor.

Generally, the quantization processing to be performed by the quantizer 103 proceeds on a macroblock-by-macroblock basis. To start the quantization of one macroblock, the quantizer 103 judges whether or not the rectangular macroblock consisting of 16×16 pixels includes the region indicated by the face detection information. If the macroblock includes the face region, the macroblock is identified as a face protection macroblock. If the macroblock does not include the face region, the macroblock is identified as the other macroblock. When a current macroblock to be quantized is a face protection macroblock, the quantizer 103 subtracts a predetermined value for quantization index adjustment from a reference quantization index $Q_0$. For example, if the predetermined value for quantization index adjustment is "3", the value of $Q_0-3$ is adopted as a quantization index Q. On the other hand, when a current macroblock to be quantized is not a face protection macroblock, the value of $Q_0+3$ obtained by adding the predetermined value for quantization index adjustment to the reference quantization index $Q_0$ is adopted as a quantization index Q.

FIG. 15 is a diagram showing a conventional face protection region. When the compression processing of one frame of data is completed, the region indicated by the face protection information is filled with face protection macroblocks. As a result, a face protection region as shown in FIG. 15 is formed. Since the quantization index Q ($=Q_0-3$), which is smaller by "6" than that of the adjacent region, is used in this face protection region, the compression ratio of the region is lower accordingly. As a result, the compression distortion is reduced, and the obtained compressed image of the person's face as an attention region is high in quality.

Next, the correlation among processings performed on a frame-by-frame basis.

FIG. 16 shows a timing chart of conventional frame-based processings. As shown in FIG. 16, the face object detector 102 starts a face object detection processing at the time indicated by an arrow A when the first frame of input image data is completely stored in the image memory 101. The face object detection processing intended for the first frame of input image data takes a longer processing time than the time required to store the second frame of input image data in the image memory 101, and ends during the storage of the third frame of input image data in the image memory 101. The quantizer 103 receives the face detection information of the first frame at the time indicated by an arrow B in FIG. 16 when the compression processing of the fourth frame of input image data starts, and uses this face detection information for the quantization of frequency domain data prepared in the DCT section 108. That is, since the face object detection processing takes a long time, it cannot be performed for every frame but only intermittently. Nevertheless, the compression processing using the face detection information can be achieved, as shown in FIG. 16.

Finally, bit rate control performed in the case where a face protection region has a large area is described. In that case, a larger region is quantized by using the quantization index $Q_0-3$, which is smaller than the reference quantization index $Q_0$, and a smaller region is quantized by using the quantization index $Q_0+3$. As a result, the amount of compressed data increases, the bit rate increases, and the amount of data that is stored temporarily in a buffer memory 111 also increases. When the bit rate of the compressed data is excessively high or the amount of data temporarily stored in the buffer memory 111 increases excessively, a bit rate controller 115 recalculates the reference quantization index $Q_0$ and updates it to an appropriate value. Specifically, the bit rate controller 115 changes the reference quantization index $Q_0$ to a larger value. Thereby, an appropriately high compression ratio can be achieved for the entire frame while maintaining the feature of the lower compression ratio of the face protection region than that of the other region, and consequently, an appropriate bit rate can be achieved. MPEG-2 and H.264/AVC also incorporate, as a standardized technique, a technique for adjusting the compression ratio with a reference quantization index $Q_0$ to obtain an appropriate stream of data that does not cause a failure of a buffer of a decoder in a reproduction apparatus.

SUMMARY OF THE INVENTION

According to a conventional method, in the case where a face protection region has a large area, the bit rate controller 115 increases the reference quantization index $Q_0$ to maintain the average bit rate almost constant, as described above. An increase in the reference quantization index $Q_0$ itself, however, makes it meaningless to correct the quantization index from $Q_0$ to $Q_0-3$ by using the face detection information. That is, the compression ratio of the face protection region that occupies a major part of a picture hardly decreases, while the compression ratio of a small-area region other than the face region increases significantly. As a result, the image quality of the other region is degraded significantly, although little improvement in the image quality of the face protection region is obtained. In view of this, it is an object of the present invention to provide an improved video compression technique capable of solving these problems.

The present invention provides a moving image processing device including: a specific target detector configured to detect, as a specific target region, a region including a specific target in an input image; a video compressor capable of compressing the input image while changing a compression ratio according to each position in the input image; and a compression ratio controller configured to output, to the video compressor, a compression control instruction for reducing the compression ratio of the specific target region detected by the specific target detector so that a degree of reduction in the compression ratio of the specific target region is small in the case where a ratio of an area of the specific target region to an entire area of the input image is relatively large and so that the degree of reduction in the compression ratio of the specific target region is large in the case where the ratio of the area of the specific target region to the entire area of the input image is relatively small.

In another aspect, the present invention provides a moving image processing method including: a specific target detection step of detecting, as a specific target region, a region including a specific target in an input image; a compression ratio control step of generating and outputting a compression control instruction for reducing a compression ratio of the specific target region detected in the specific target detection step so that a degree of reduction in the compression ratio of the specific target region is small in the case where a ratio of an area of the specific target region to an entire area of the input image is relatively large and so that the degree of reduction in the compression ratio of the specific target region is large in the case where the ratio of the area of the specific target region to the entire area of the input image is relatively small; and a video compression step of performing a compression processing of the specific target region according to the compression control instruction generated in the compression ratio control step.

In still another aspect, the present invention provides an imaging apparatus including: an imaging sensor configured to capture an image of a subject; an image generator configured to process an output of the imaging sensor to generate processed image data; and the above-mentioned moving image processing device of the present invention configured to receive, as input image data, the image data generated by the image generator, and generates compressed data from the received input image data.

The present inventors studied intensively how to improve the image quality of a specific target (typically, a person's face). As a result, they found it inappropriate to reduce the compression ratio equally in both the cases where the face has a large area in the picture and where the face has a small area in the picture. Even in the case where the face has a large area in the picture, the regions adjacent to the characteristic components such as eyes, a nose, and a mouth seem to have high spatial frequencies. However, the other regions (such as a forehead, cheeks, and a chin) that occupy the major part of the face have relatively low spatial frequencies. Therefore, in this case, even if the compression ratio is not reduced so much, compressed data from which a clear image of the face can be reproduced is obtained. On the other hand, in the case where the face has a small area in the picture, a clear image of the face cannot be reproduced without reducing the compression ratio sufficiently.

In the present invention, the degree of reduction in the compression ratio of the specific target region is small in the case where the ratio of the area of the specific target region (typically, a face region) to the entire area of the input image is relatively large. On the other hand, the degree of reduction in the compression ratio of the specific target region is large in the case where the ratio of the area of the specific target region to the entire area of the input image is relatively small. With this configuration, even if the value of the reference quantization index $Q_0$ is increased to maintain an almost constant average bit rate, the compression ratio of the small-area face region (specific target) can be reduced sufficiently. Accordingly, compressed data from which a clear image of the small-area face can be reproduced is obtained reliably. On the other hand, in the case of the large-area face, a sufficient image quality to recognize the face can be maintained even if the compression ratio hardly decreases as a result of the increase of the reference quantization index $Q_0$.

BRIEF DESCRIPTION OF THE DRAWINGS

FIG. 9 is a diagram showing a structure of a face protection map obtained when the face protection regions have a large area, according to the another embodiment of the present invention.

FIG. 11 is a diagram showing a structure of a face protection map according to the still another embodiment of the present invention.

DETAILED DESCRIPTION OF THE INVENTION

Hereinafter, embodiments for implementing the present invention will be described with reference to the accompanying drawings.

First Embodiment

Figure 1:
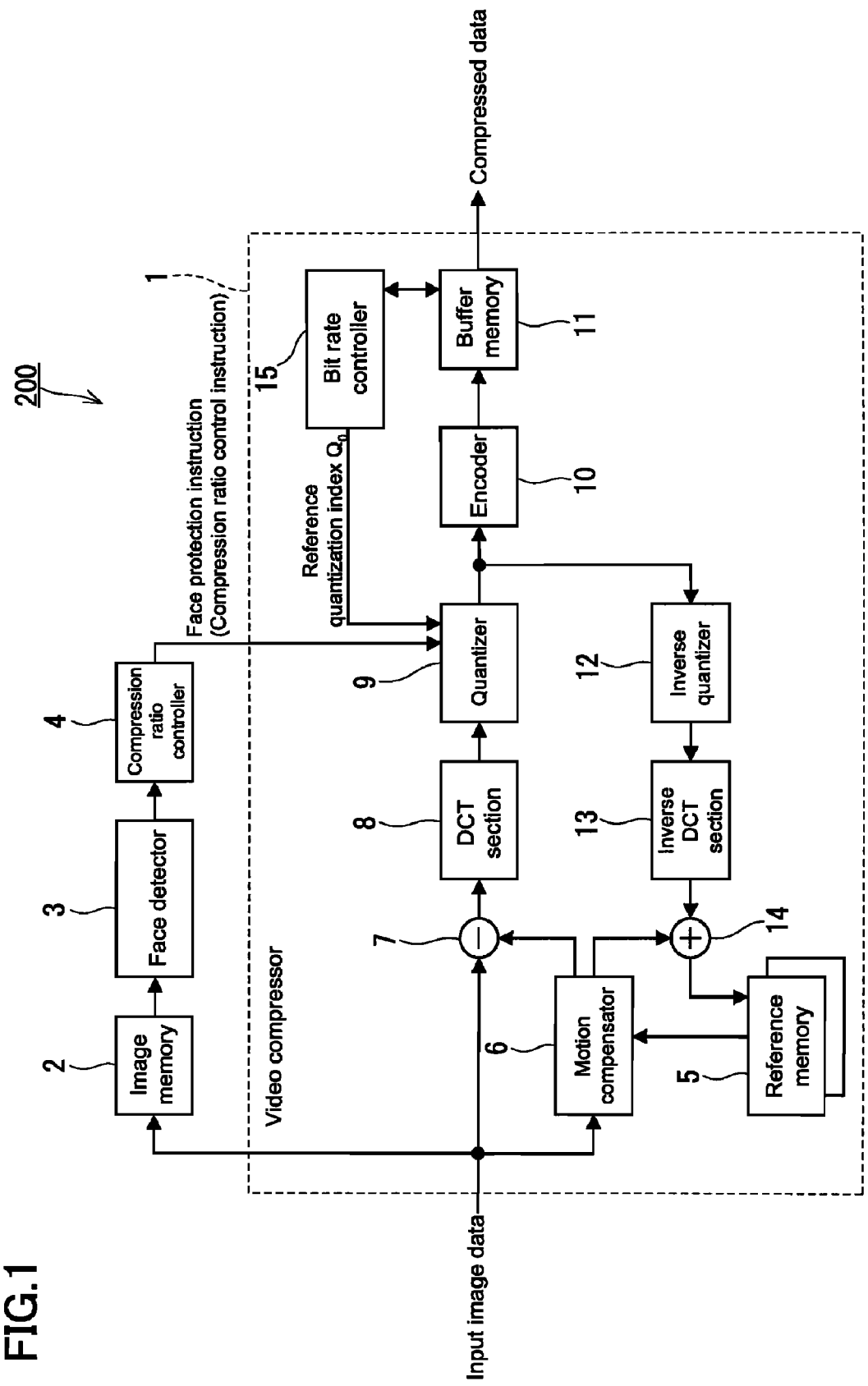
FIG. 1 is a block diagram showing a configuration of a moving image processing device according to an embodiment of the present invention.

FIG. 1 is a block diagram showing a configuration of a moving image processing device according to a first embodiment of the present invention. FIG. 1 merely shows a typical configuration of a moving image processing device, and not all the components are essential.

As shown in FIG. 1, a moving image processing device 200 includes a video compressor 1, an image memory 2, a face detector 3, and a compression ratio controller 4. Input image data is supplied to the video compressor 1 and the image memory 2 respectively, and the output of the image memory 2 is supplied to the face detector 3. The face detector 3 detects (extracts), as a specific target, a face in the input image data, and outputs face detection information. The compression ratio controller 4 generates a face protection instruction based on the face detection information obtained from the face detector 3, and outputs the generated instruction. The "face protection instruction" means a compression control instruction for reducing the compression ratio of the face region extracted by the face detector 3.

The video compressor 1 includes a reference memory 5, a motion compensator 6, a subtracter 7, a DCT section 8, a quantizer 9, an encoder 10, a buffer memory 11, an inverse quantizer 12, an inverse DCT section 13, an adder 14, and a bit rate controller 15. The input image data is compressed through the subtracter 7, the DCT section 8, the quantizer 9, and the encoder 10, and the compressed image data is stored in the buffer memory 11. The bit rate controller 15 manages the buffer memory 11, and prepares an optimum reference quantization index $Q_0$ and supplies the prepared reference quantization index $Q_0$ to the quantizer 9. The output of the quantizer 9 is decoded through the inverse quantizer 12, the inverse DCT section 13, and the adder 14. The decoded image data is stored in the reference memory 5 so as to be used as reference image data. The motion compensator 6 receives the decoded image data from the reference memory 5, and prepares predicted image data by using the decoded image data and the input image data, and outputs the prepared predicted image data to the subtracter 7.

Hereinafter, the operation of the moving image processing device 200 according to the first embodiment of the present invention will be described in detail. First, as a basic operation, the operation performed in the case where the input image data does not include a person's face is described.

The input image data is stored in sequence in the image memory 2, and when one frame of data is stored, the face detector 3 performs a face object detection processing, and supplies the resulting face detection information to the compression ratio controller 4. Since the current input image data does not include a person's face, null face detection information is supplied to the compression ratio controller 4. Upon receiving the null face detection information, the compression ratio controller 4 outputs a face protection instruction indicating that there is no face to be protected.

The video compressor 1 performs video compression of the input image data. The video compressor 1 performs the compression in frame mode according to the MPEG-2 standard. The motion compensator 6 estimates a motion vector by using the reference image data stored in the reference memory 5 and the current input image data, extracts the optimum region in the reference image data, and outputs the extracted region as predicted image data. The subtracter 7 calculates a difference between the predicted image data and the current input image data as residual data. The DCT section 8 performs discrete cosine transform, which is one of the orthogonal transform techniques, on the residual data to generate frequency domain data (DCT coefficients), and outputs it. Upon receiving the face protection instruction indicating that there is no face to be protected, the quantizer 9 uses, without any modification, the reference quantization index $Q_0$ supplied from the bit rate controller 15, as a quantization index Q, to quantize the frequency domain data according to the reference quantization index $Q_0$. Specifically, the quantizer 9 quantizes the frequency domain data by using a quantization matrix multiplied by the reference quantization index $Q_0$. The quantized data is subjected to variable length coding by the encoder 10, stored temporarily in the buffer memory 11, and then outputted as compressed data.

On the other hand, the output of the quantizer 9 is subjected to inverse quantization and inverse DCT by the inverse quantizer 12 and the inverse DCT section 13. Then, in the adder 14, the resulting data is added to the predicted image data outputted from the motion compensator 6. As a result, the decoded image data is obtained, and stored in the reference memory 5 so as to be used as reference image data for the compression processing of the following frames. The bit rate controller 15 controls the transmission operation of the buffer memory 11, and determines the optimum reference quantization index $Q_0$. Specifically, the bit rate controller 15 determines the reference quantization index $Q_0$ on a frame-by-frame basis while outputting the compressed data to the outside at an appropriate bit rate, so as to prevent the buffer memory 11 from overflowing due to an excessive amount of compressed data stored or to prevent compressed data to be outputted therefrom to the outside from being depleted.

The quantization index Q used by the quantizer 9 is an index for determining the quantization step size. A larger quantization index Q indicates a larger quantization step size. That is, as the quantization index Q increases, the compression ratio increases and the amount of data decreases, but compression distortion increases. In the case where the quantizer 9 uses the reference quantization index $Q_0$ as a quantization index Q without any modification, the bit rate controller 15 can control directly the bit rate of the compressed data by using the quantization index $Q_0$.

Next, the case where the input image data includes a person's face is described.

The face detector 3 performs the face object detection processing of the input image data. Specifically, the face detector 3 captures the face image portion included in the input image data as an object, and detects the person's face based on the characteristic components of the face such as eyes, a nose, and a mouth and the positional relationship between these components. The face detector 3 further identifies a region including the person's face (face region) as a rectangular region, and outputs face detection information composed of the central coordinates of the face region and the size of the face region to the compression ratio controller 4. The compression ratio controller 4 partitions one frame of image data into protection unit blocks for management.

Figure 2:
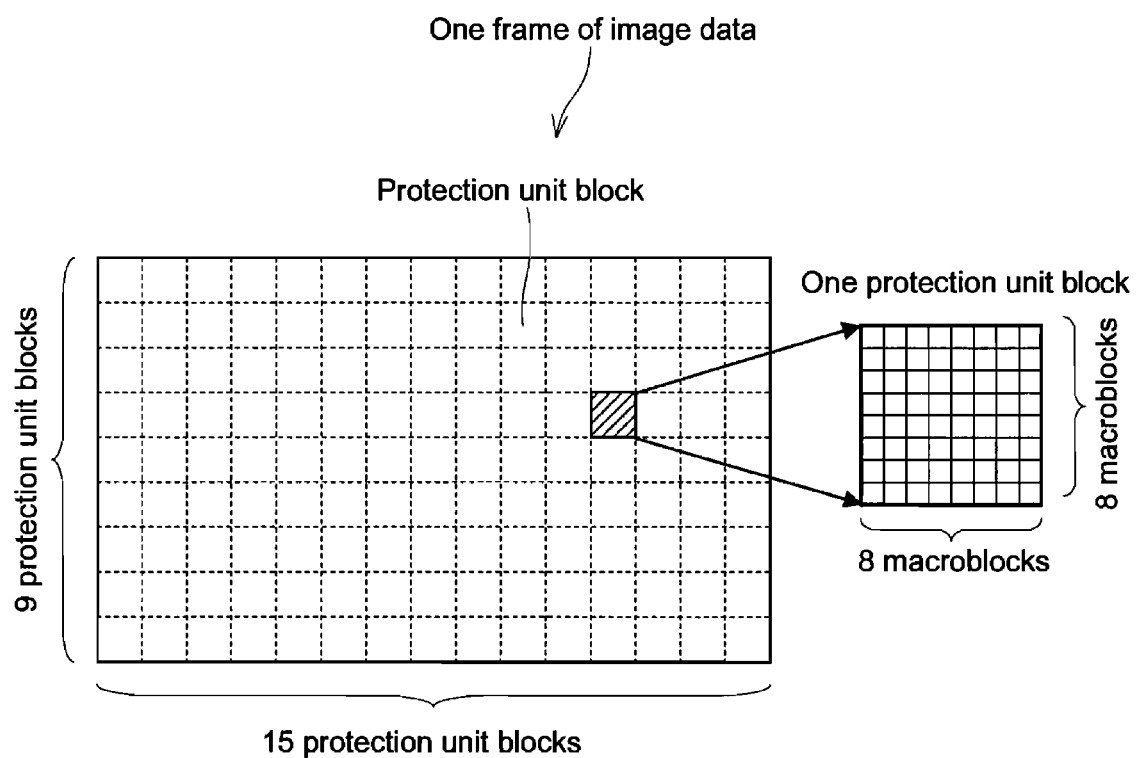
FIG. 2 is a diagram showing a structure of a protection unit block according to the embodiment of the present invention.

FIG. 2 is a diagram showing the structure of protection unit blocks. In an example shown in FIG. 2, image data with a size of 1920 pixels wide×1080 pixels high is handled as one frame of image data for high-definition television applications. In the first embodiment, a high-definition television image is used as input image data, but the present invention is not limited to this image size. Input image data may consist of any number of pixels. As shown in FIG. 2, the compression ratio controller 4 partitions one frame of image into a plurality of regions (9 regions in the vertical direction×15 regions in the horizontal direction), and manages the frame as 135 protection unit blocks in total. One protection unit block consists of 64 macroblocks (8 macroblocks in the vertical direction×8 macroblocks in the horizontal direction). The compression ratio controller 4 receives the face detection information from the face detector 3 at the time when the processing of one frame of data is started, and reconstructs the face region as a rectangular region. The compression ratio controller 4 further enlarges the reconstructed face region to calculate an enlarged face region.

Figure 3:
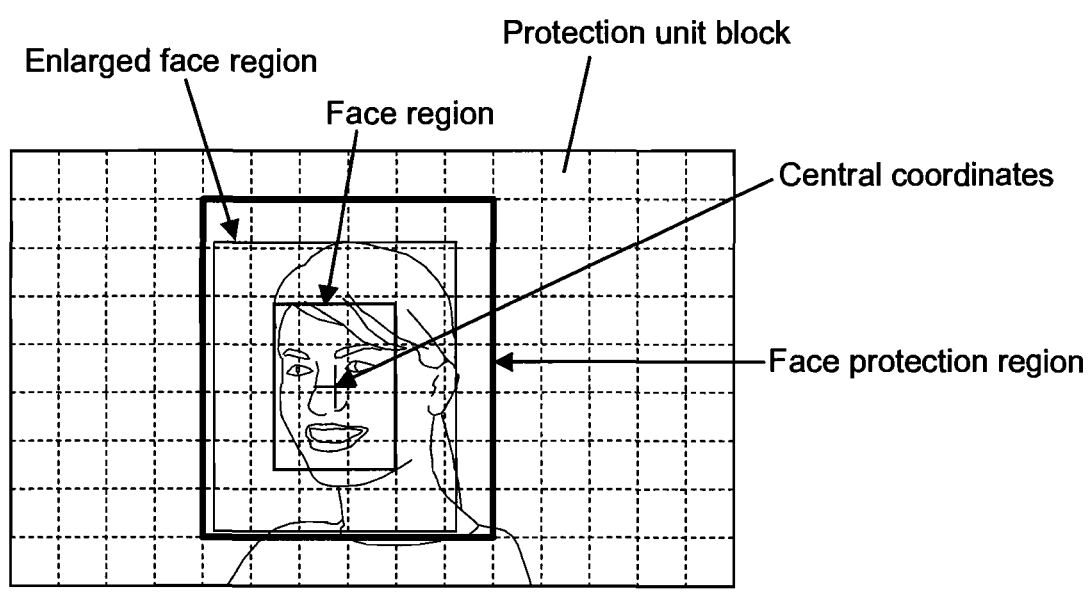
FIG. 3 is a diagram showing a correlation among a face region, an enlarged face region, and a face protection region according to the embodiment of the present invention.

FIG. 3 shows a correlation among the face region, the enlarged face region, and the face protection region. In the first embodiment, the face region is enlarged by a factor of 1.5 in the vertical direction and by a factor of 2 in the horizontal direction with respect to the central coordinates of the face region so as to calculate the enlarged face region, as shown in FIG. 3. The compression ratio controller 4 determines the protection unit blocks included in the enlarged face region to be a face protection region, and holds in itself the determined face protection region as a face protection map.

Figure 4:
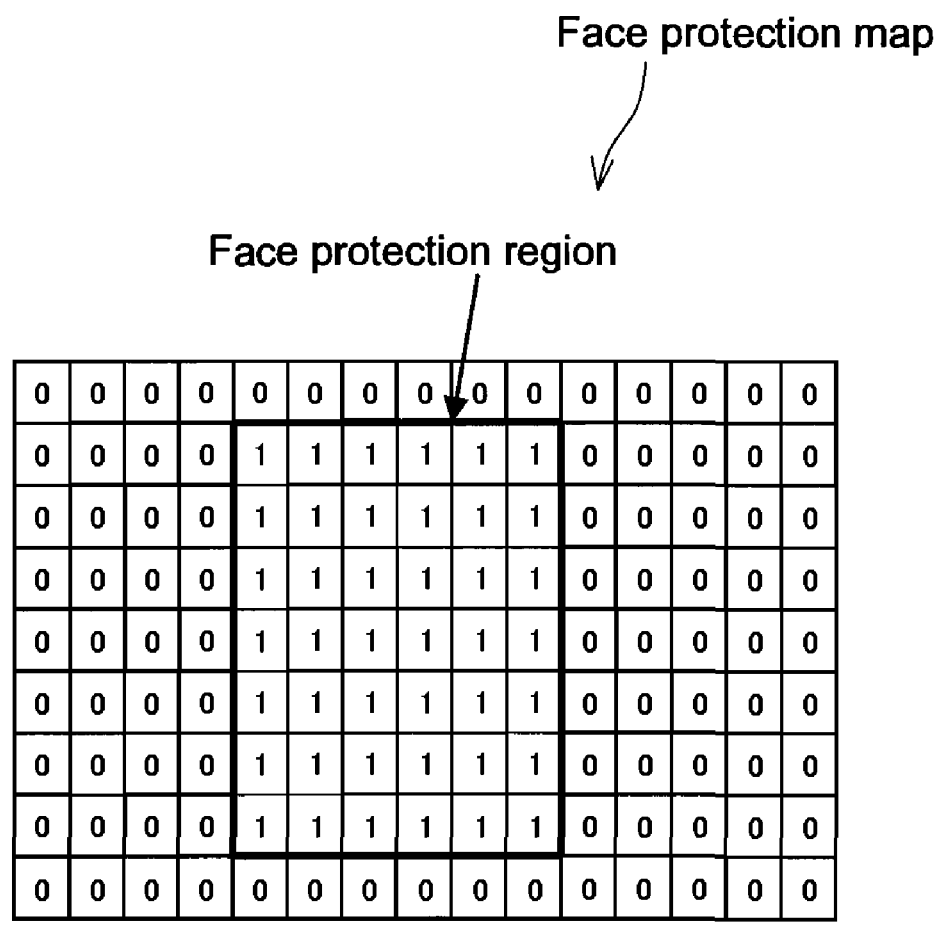
FIG. 4 is a diagram showing a structure of a face protection map according to the embodiment of the present invention.

FIG. 4 is a diagram showing a structure of the face protection map according to the first embodiment. As shown in FIG. 4, the face protection map is configured to manage one protection unit block by one-bit information. That is, the face protection map consists of 135-bit information in total (9 bits in the vertical direction×15 bits in the horizontal direction). Specifically, each protection unit block of the face protection region is stored as "1", and that of the other region is stored as "0".

Figure 5:
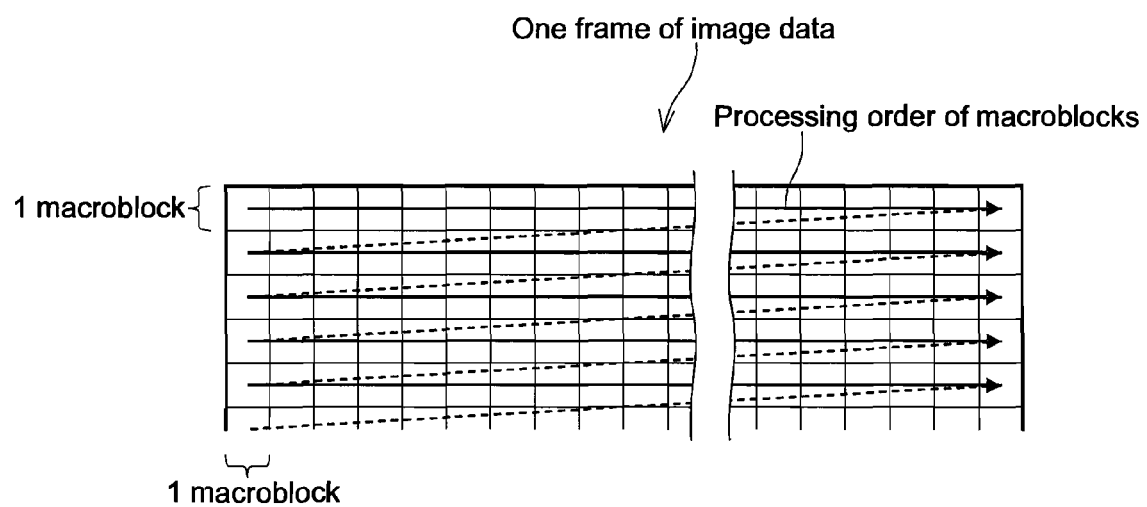
FIG. 5 is a diagram showing a processing order of macroblocks according to the embodiment of the present invention.

FIG. 5 shows a processing order of macroblocks. When the compression processing of one frame is started, macroblocks are processed one by one from the left to the right, as shown in FIG. 5. When the processing of the first row of macroblocks is completed, the processing of the second row of macroblocks proceeds from the left to the right. At the time when the compression ratio controller 4 starts the processing of the leftmost macroblock of each row, it extracts the corresponding 15-bit information of one row from the face protection map. Every time the processing of 8 macroblocks is completed, the compression ratio controller 4 shifts the information extracted from the face protection map by one bit. Then, the compression ratio controller 4 judges whether or not a current macroblock belongs to a face protection region based on the value of the most significant bit of the information. That is, when the most significant bit is 1, the compression ratio controller 4 judges that the macroblock belongs to the face protection region, and outputs a face protection instruction. The quantizer 9 uses, as a quantization index Q, a value obtained by subtracting a predetermined value for quantization index adjustment (for example, a numerical value of "3") from the reference quantization index $Q_0$ supplied from the bit rate controller 15, to perform the quantization processing of the current macroblock. As understood from the above description, in the first embodiment, a "value for quantization index adjustment" is a value that defines a degree of reduction in the compression ratio of the face protection region with respect to the compression ratio of the region other than the face protection region.

As a result of the above processing, the quantization index Q for the macroblocks belonging to the face protection region shown in FIG. 3 have a value smaller by, for example, "3" than the other region. A smaller quantization index Q indicates a smaller quantization step size. Thereby, the compression ratio of these macroblocks decreases, and the image quality of the face protection region is improved.

Next, the correlation among processings performed on a frame-by-frame basis is described.

Figure 6:
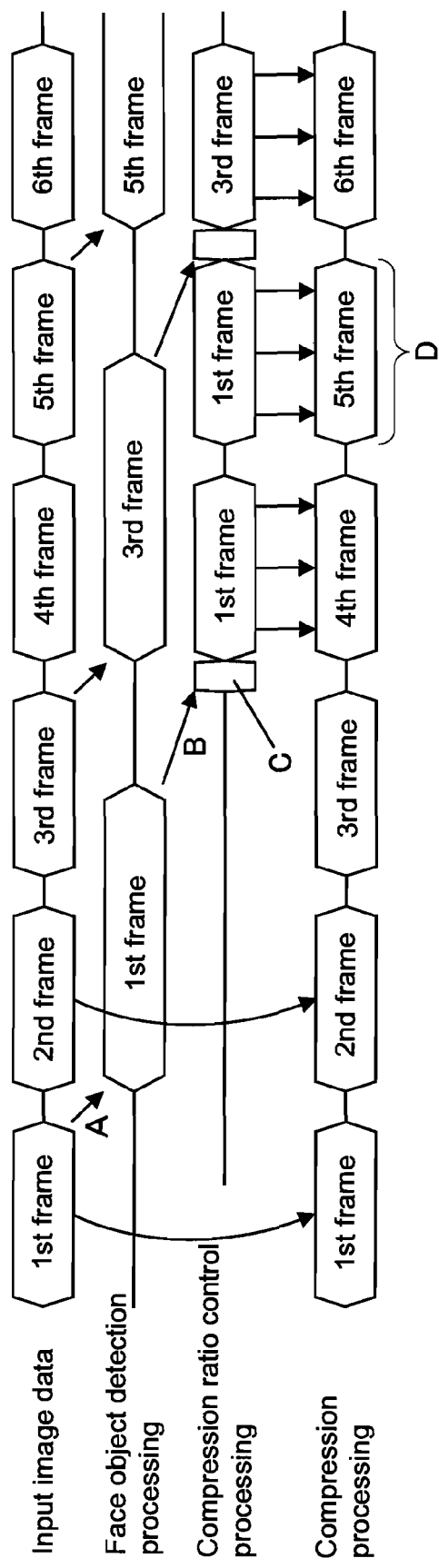
FIG. 6 is a timing chart of frame-based processings according to the embodiment of the present invention.

FIG. 6 shows a timing chart of processings performed on a frame-by-frame basis in the first embodiment. As shown in FIG. 6, the face detector 3 starts the face object detection processing at the time indicated by an arrow A when the first frame of input image data is completely stored in the image memory 2. The face object detection processing of the first frame of input image data takes a longer processing time than the time required to store the second frame of input image data in the image memory 2, and ends during the storage processing of the third frame of input image data in the image memory 2. Upon completing the compression processing of the third frame of input image data, the compression ratio controller 4 receives the face detection information of the first frame at the time indicated by an arrow B in FIG. 6, and prepares the face protection map during a period of time indicated by a character C. The compression ratio controller 4 holds the prepared face protection map, and supplies the face protection instruction to the quantizer 9 during the compression processing of the following fourth and fifth frames of input image data. That is, since the face object detection processing takes a long processing time, it cannot be performed for every frame but only intermittently, as in the above-mentioned conventional example. Nevertheless, the compression processing using the face detection information can be performed. Furthermore, as indicated by a character D in FIG. 6, the face detection information obtained from the first frame is used for the compression processing of the fifth frame. As a result, the actual face position and size also may be different from those of the face detection information, as in the conventional example.

Figure 7:
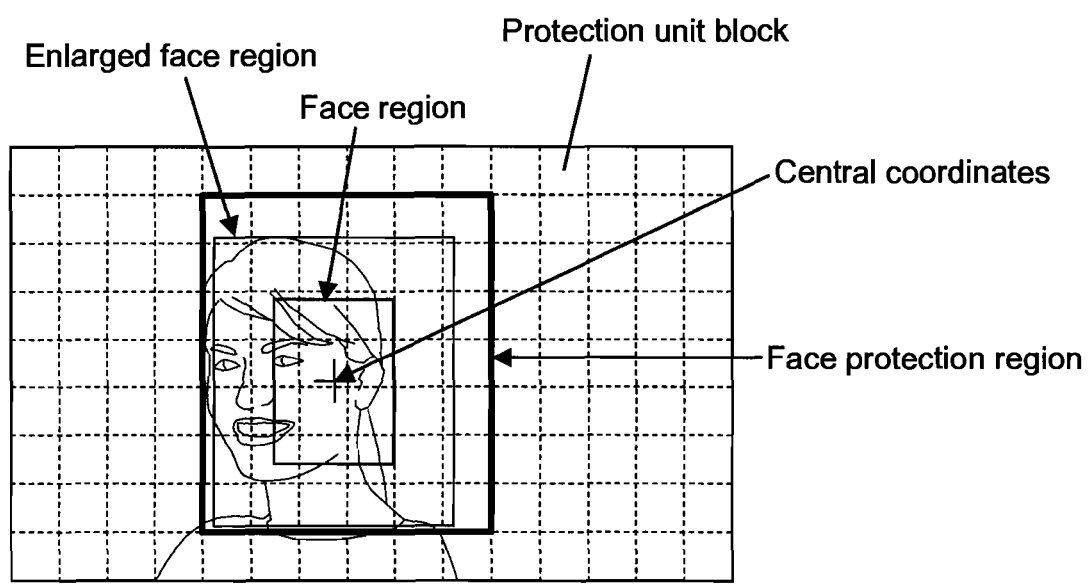
FIG. 7 is a diagram showing a displacement of a face region from an input image according to the embodiment of the present invention.

FIG. 7 is a diagram showing a displacement of face detection information from an input image according to the first embodiment, and it is assumed here that the face detection information obtained from the first frame is applied to the compression processing of the fifth frame of input image data. In FIG. 7, the face region is displaced from the actual face position in the input image. In the first embodiment, however, since the enlarged face region is introduced, the actual face position is included within the face protection region. Accordingly, the image quality of the face portion can be improved reliably. According to the MPEG-2 standard, I pictures (intra pictures), P pictures (predictive pictures), and B pictures (bi-directional predictive pictures) are reordered, and therefore the order in which images (pictures) are inputted is different from the order in which the images are subjected to a compression processing. For ease of explanation, however, FIG. 6 is shown assuming that the images that have already been reordered are inputted in sequence.

Figure 16:
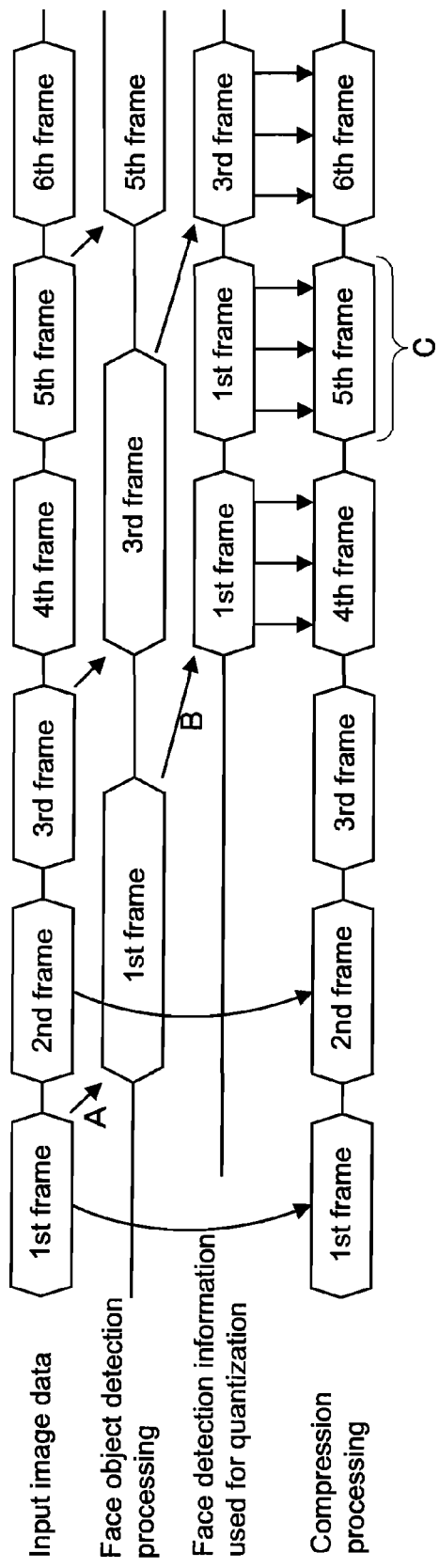
FIG. 16 is a timing chart of frame-based processings in the conventional device.
Figure 17:
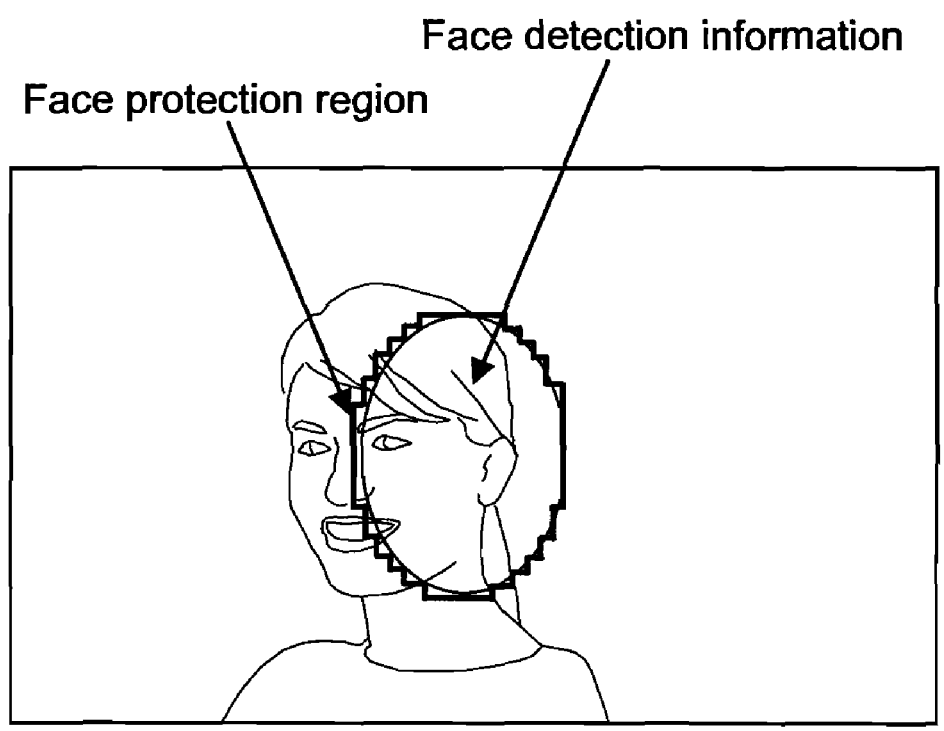
FIG. 17 is a diagram showing a displacement of a face protection region from an input image.

In a conventional moving image processing device, whether or not a face region is included needs to be determined on a macroblock-by-macroblock basis. Generally, the processing of one macroblock must be performed in a short time, and high-speed processing is required. Such high-speed processing, however, cannot be achieved by a conventional technique even if a minor process is assigned additionally to a microprocessor, which causes a problem that a dedicated hardware is required. Furthermore, in the case where there is a time lag between the image data to be compressed and the face detection information to be used therefor, for example, in the case where the face detection information obtained from the first frame is used for the compression processing of the fifth frame, as indicated by a character C in FIG. 16, the actual face position and size may be different from those in the face detection information, as shown in FIG. 17, which causes a problem that the image quality of a part of the face is degraded.

In contrast, in the first embodiment, the compression ratio controller 4 is provided to judge whether or not the compression ratio should be reduced by using the protection unit block consisting of a plurality of macroblocks. Specifically, the video compressor 1 (more specifically, the quantizer 9) is capable of compressing the input image while changing the compression ratio on a macroblock-by-macroblock basis by quantizing the input image on the macroblock-by-macroblock basis. The compression ratio controller 4 partitions the input image into the protection unit blocks each consisting of the plurality of macroblocks, and outputs a compression control instruction to the quantizer 9 of the video compressor 1 to reduce the compression ratio of the protection unit block including the face region extracted by the face detector 3.

Figure 13:
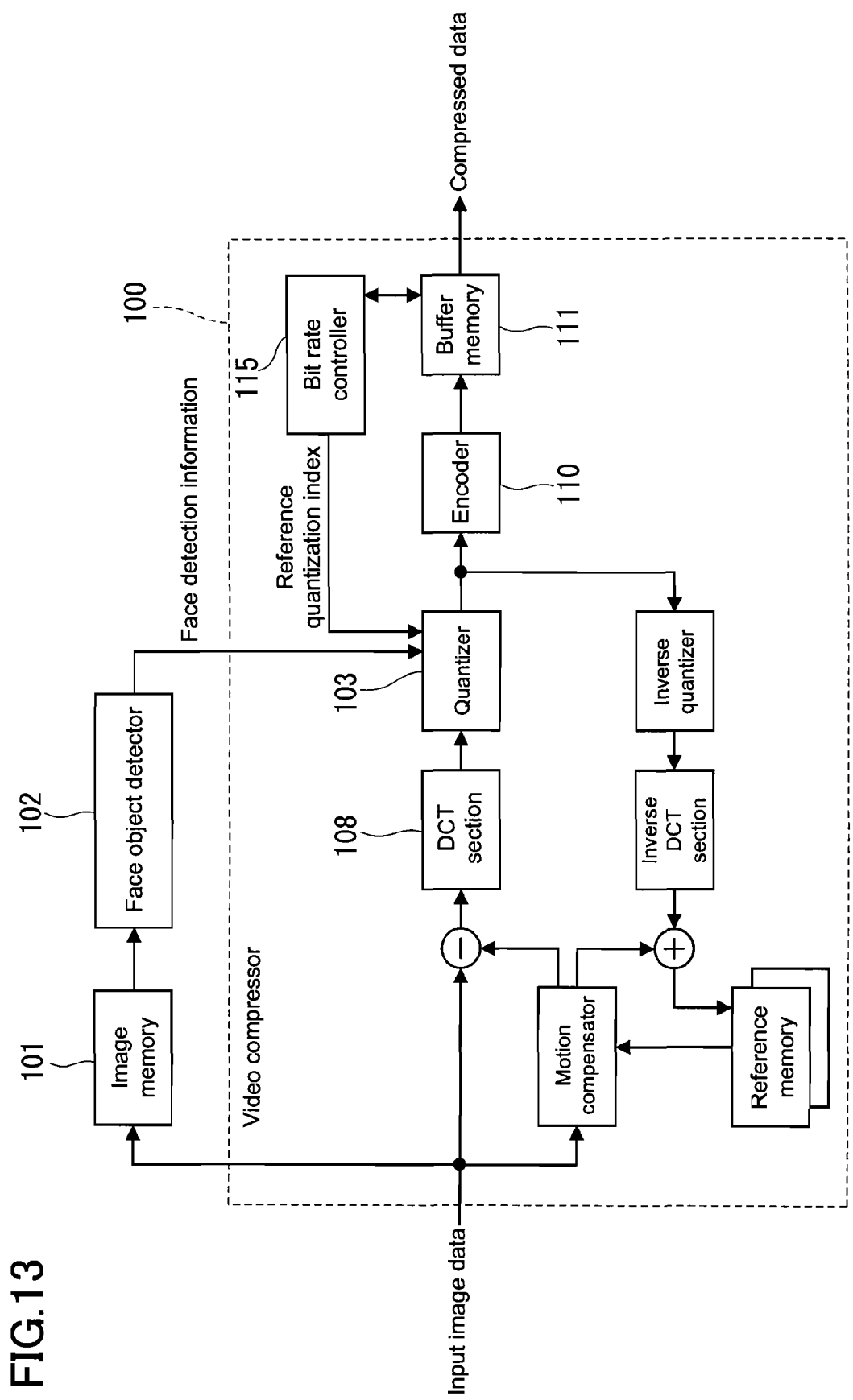
FIG. 13 is a diagram showing a configuration of a conventional moving image processing device.
Figure 14:
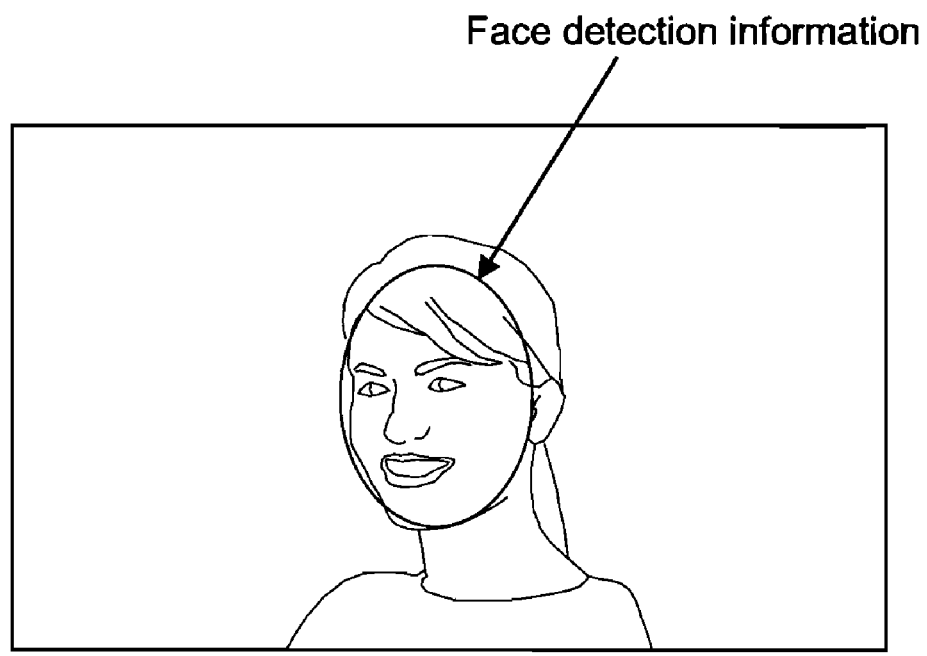
FIG. 14 is a diagram showing face detection information in the conventional device.
Figure 15:
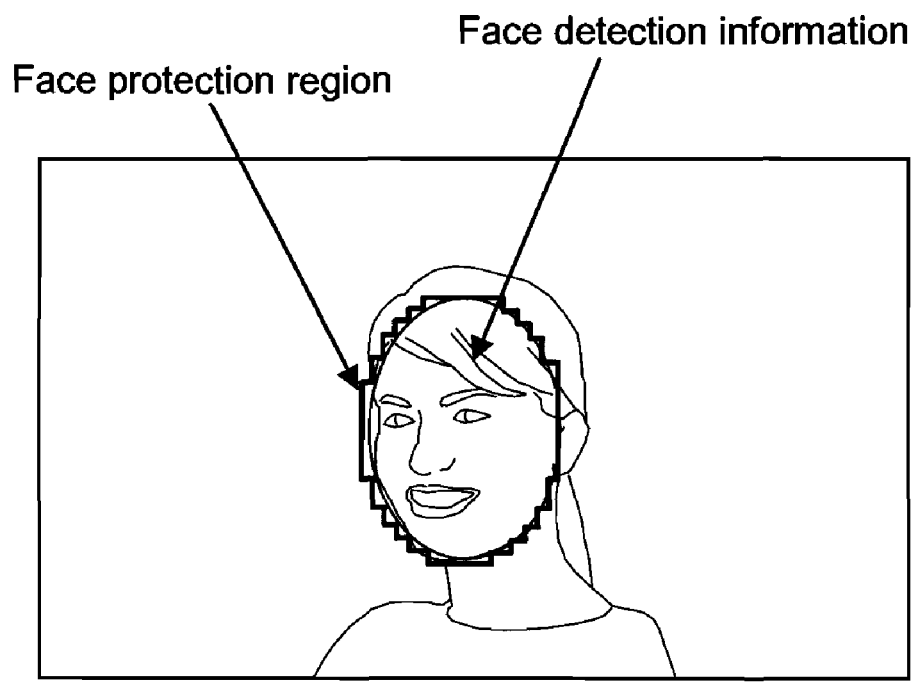
FIG. 15 is a diagram showing a face protection region in the conventional device.

With the above configuration, the number of judgments of whether or not the face region is included is reduced significantly. In the conventional device shown in FIG. 13, 8160 judgments are needed for each frame. In the first embodiment, the number of judgments is reduced to 135, which corresponds to only 1.7% of the conventional device. When a face region is rectangular, a face protection map can be generated with only an arithmetic operation and a logical OR operation. Furthermore, the 135 judgments and the preparation of the face protection map have only to be completed during a time period between the compression processing of one frame of data and that of the following frame of data, as indicated by a character C in FIG. 6. That is, high-speed processing is not required. It is only necessary to add very simple processes, that is, the determination of the bit and the adjustment of the quantization index Q, to the macroblock-based processing that is required to be performed at high speed. Therefore, the addition of a special hardware for high-speed processing is not essential to implement the first embodiment. When the above-mentioned processes are incorporated into a part of the processing of a digital signal processor or a microprocessor that constitutes each processing block in the video compressor 1, the first embodiment can be implemented very easily and at very low cost.

The compression ratio controller 4 also extracts the enlarged face region obtained by enlarging the face region, and outputs the compression control instruction to the quantizer 9 to reduce the compression ratio of the protection unit blocks included in the enlarged face region. That is, since it is configured to obtain the enlarged face region to determine the face protection region, the face protection region of which the compression ratio should be reduced is enlarged, and thereby the image quality of the region adjacent to the face, such as hairs, a facial contour, and a neck, also can be improved. Furthermore, even when the face position and size in the current image being subjected to the compression processing are different from those in the face detection information, as shown in FIG. 7, the face portion can be included within the face protection region to improve the image quality of the face region in most cases.

In the description of the first embodiment, the case where the input image includes one person's face has been described. Needless to say, the same advantageous effects can be obtained by the same processing even in the case where the input image includes a plurality of faces.

In the method described in the first embodiment, the processing to judge whether or not each protection unit block should be handled as a face protection region is performed and completed during a period of time indicated by the character C in FIG. 6 and the result of the judgment is held as the face protection map. The judgment processing may be performed at any other time, and any other holding technique may be used. According to the first embodiment, whether or not each protection unit block should be handled as a face protection region is judged only once. Therefore, there is no need to perform the judgment processing for each of the macroblocks included in the protection unit block, which results in a very small total number of judgment results. Accordingly, the first embodiment can be implemented with a simple configuration even by using a technique other than the timing chart in FIG. 6 or the face protection map.

In the first embodiment, each protection unit block consists of 64 macroblocks, but it may consist of macroblocks of any other size. For example, one protection unit block may consist of 16 macroblocks (4 macroblocks in the vertical direction×4 macroblocks in the horizontal direction). In this case, one frame consists of 510 protection unit blocks in total (17 blocks in the vertical direction×30 block in the horizontal direction). Therefore, the amount of the processing to judge whether or not each protection unit block should be handled as a face protection region can be reduced to a very low level, which corresponds to only about 6.3% of the above-mentioned conventional one.

In the first embodiment, the compression ratio controller 4 enlarges the face region by a factor of 1.5 in the vertical direction and by a factor of 2 in the horizontal direction with respect to the central coordinates of the face region so as to calculate the enlarged face region, as shown in FIG. 3. Any other method may be used to enlarge the face region. Instead of an enlargement using scaling factors, lengths to be elongated in the vertical and horizontal directions may be added to the lengths of the face region. When a face portion is moving in an input image, if the moving speed is equal to or lower than a certain level, the great effect is obtained by reducing the compression ratio to improve the image quality. However, if the moving speed is higher than the certain level, camera shake occurs during shooting and the amount of image information of the face portion decreases significantly. As a result, the need for reducing the compression ratio to improve the image quality is reduced. The upper limit of the moving speed that would be effective for the improvement depends on the compression efficiency and the bit rate in the video compressor 1. As shown in FIG. 6, in the case of the first embodiment, there is a time lag of up to four frames between the frame used for the determination of the face protection region and the frame being subjected to compression processing. Therefore, when the scaling factors or the lengths to be added are set for the enlarged face region at levels high enough to compensate for the movement corresponding to the four frames at the moving speed of the face whose image quality should be improved, the most efficient image quality improving effect is obtained.

In the first embodiment, the compression ratio controller 4 reduces the compression ratio of the macroblocks in the face protection region. It may be configured to implement the processing to increase the compression ratio of the macroblocks other than those in the face protection region as well. The video compressor 1 compresses the input image data in frame mode. It may be configured to compress the input image data in field mode. In this case, the compression ratio controller 4 holds a face protection map in field mode. The video compressor 1 is configured to perform the video compression processing according to the MPEG-2 standard. It may perform the processing according to the H.264/MPEG-4 AVC standard or other video compression techniques.

Next, a method of adjusting the compression ratio according to the ratio of the area of the face protection region to the entire area of the input image is described below. Specifically, the compression ratio is adjusted so that a degree of reduction in the compression ratio of the face protection region is small in the case where the ratio of the area of the face protection region is relatively large. The compression ratio is adjusted so that the degree of reduction in the compression ratio of the face protection region is large in the case where the ratio of the area of the face protection region is relatively small. That is, the purpose of the technique to be described below is to reduce preferentially the compression ratio of a face having a small area in a picture so as to reproduce a clear image of the face. Although the compression ratio of a face having a large area in the picture also is reduced, the degree of reduction in the compression ratio is limited to some extent.

The "degree of reduction in the compression ratio" means a degree or a magnitude of reduction from the compression ratio (reference compression ratio) of a face protection region that should be employed in the case where the corresponding face protection instruction (compression control instruction) is not prepared nor outputted. For more detail, the degree of reduction in the compression ratio is determined based on the difference between the reference quantization index $Q_0$ supplied from the bit rate controller 15 to the quantizer 9 and the quantization index Q that is actually used for the compression processing of the face protection region. The "degree of reduction in the compression ratio" also may mean a degree of reduction with respect to the compression ratio of the region other than the face protection region in some cases.

Figure 8:
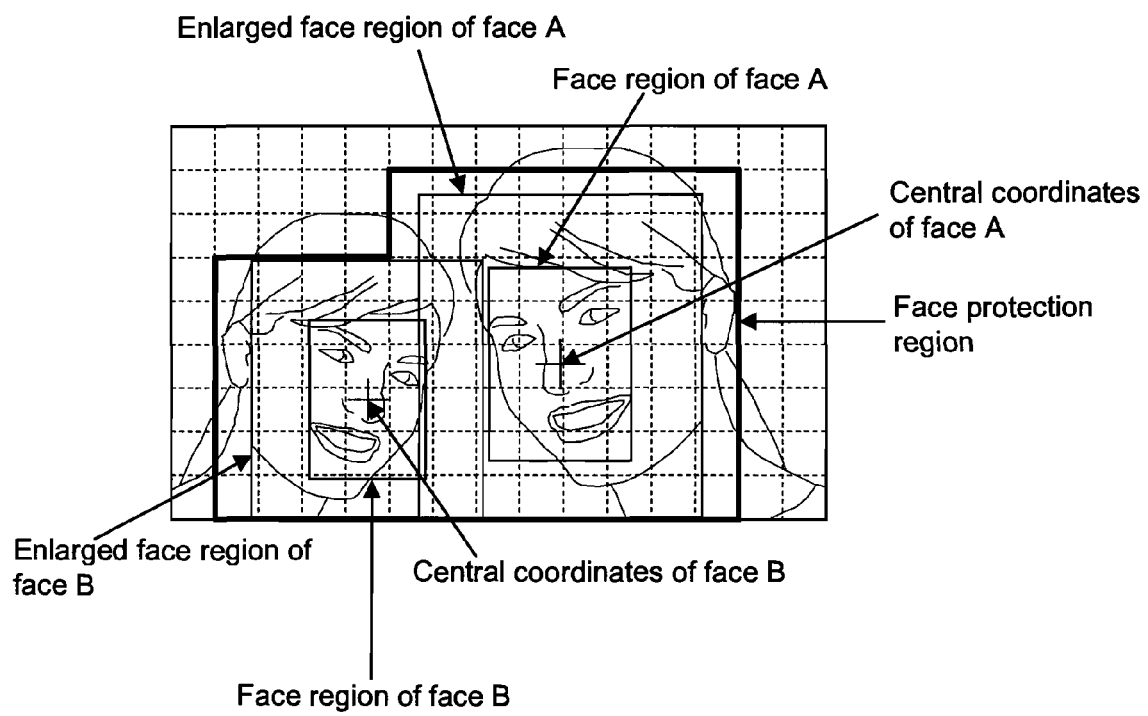
FIG. 8 is a diagram showing a relationship between an input image and face protection regions obtained when the face protection regions have a large area, according to another embodiment of the present invention.

FIG. 8 shows an example of face protection regions, and FIG. 9 shows a structure of a face protection map obtained in that case. FIG. 8 shows an example in which an input image includes two persons' faces each having a large area therein. The face protection map is prepared in the form as shown in FIG. 9 based on the protection region of the face A and that of the face B.

Immediately after preparing the face protection map, the compression ratio controller 4 calculates the total area of the face protection regions. Specifically, it calculates the total area of the face protection regions based on the number of protection unit blocks included therein. As shown in Table 1, the compression ratio controller 4 stores previously a table that defines the correlationship between the total areas of the face protection regions and the corresponding protection ratios. The compression ratio controller 4 determines the protection ratio based on the total area of the face protection regions by referring to the definition table in Table 1. It multiplies a predetermined maximum value for quantization index adjustment by the protection ratio to determine the value for quantization index adjustment. As stated herein, the "protection ratio" is a parameter used to adjust the degree of reduction in the compression ratio of the face protection region. The compression ratio of the face protection region decreases as the protection ratio therefor increases. The "maximum value for quantization index adjustment" means a value that defines the maximum degree of reduction in the compression ratio.

In the case of the example of FIG. 8 and FIG. 9, the total area of the face protection regions corresponds to 90 protection unit blocks, and therefore the protection ratio is determined to be 0.4 from Table 1. For example, if the maximum value for quantization index adjustment is defined previously as a value of "6", a value obtained by multiplying 6 by 0.4 (6×0.4=2.4) is rounded off to determine the degree of reduction in the quantization index to be "2".

TABLE 1

| | Total area of face protection regions | | | | | |
|---|---|---|---|---|---|---|
| | 1 to 16 | 17 to 32 | 33 to 64 | 65 to 96 | 97 to 128 | 129 to 135 |
| Protection ratio | 1.0 | 0.8 | 0.6 | 0.4 | 0.2 | 0 |

When the macroblock-based processing is started, the compression ratio controller 4 judges whether or not a current macroblock to be processed is included in the face protection region based on the face protection map. When the macroblock is included in the face protection region, the compression ratio controller 4 gives a face protection instruction indicating that the quantization index should be reduced by "2" to the quantizer 9. The quantizer 9 sets a quantization index Q by subtracting "2" from the reference quantization index $Q_0$ given from the bit rate controller 15 according to the face protection instruction, and carries out the quantization processing of the face protection region by using the set quantization index Q. On the other hand, the reference quantization index $Q_0$ is used without any modification for the quantization processing of the region other than the face protection region. In this way, the image quality can be improved while reducing the compression ratio of the face protection region. In Table 1, the protection ratio is set at a lower level as the total area of the face protection regions increases. Table 1 shows clearly the operation to output a face protection instruction so that the degree of reduction in the compression ratio becomes small in the case where the total area of the face protection regions is large and to output a face protection instruction so that the degree of reduction in the compression ratio becomes large in the case where the total area of the face protection regions is small. As is clear from Table 1, the reference quantization index $Q_0$ is used without any modification in some cases even for the face protection region (in the case where the protection ratio is zero).

In the case where the total area of the faces included in the input image is large, it is impossible technically to continue improving the image quality of the face protection regions unilaterally while controlling the bit rate at a target value or preventing the failure of the buffer memory 11. Even if the value for quantization index adjustment is set to a large value, the image quality of the face protection region hardly is improved, as described as a problem of a conventional technique. Rather, noticeable degradation of the image quality of other region is observed, which causes the opposite effect.

In contrast, according to the first embodiment, the protection ratio is increased to reduce the quantization index considerably in the case where the total area of the face protection regions is small. As a result, the image quality of the face regions is improved as in the conventional technique. On the other hand, in the case where the total area of the face protection regions is large and the opposite effect is caused, the protection ratio is reduced so that the degree of reduction in the quantization index becomes small. As a result, excessive degradation of the image quality of the region other than the face protection region can be prevented. That is, in the first embodiment, the compression ratio controller 4 increases the degree of reduction in the compression ratio of the face protection region in a stepwise manner as the ratio of the area of the face protection region (in other words, the face region) to the entire area of the input image becomes smaller. As a result, the optimum image quality can be obtained based on the total area of the faces.

In the case where the input image includes a plurality of face protection regions, the compression ratio controller 4 prepares a face protection instruction (compression control instruction) based on the ratio of the total area of the plurality of face protection regions to the entire area of the input image. Specifically, the face protection instruction is prepared so that the degree of reduction in the compression ratio is small in the case where the total area of the face protection regions is relatively large and so that the degree of reduction in the compression ratio is large in the case where the total area of the face protection regions is relatively small. In this way, the plurality of face protection regions and the region other than the face protection regions can be compressed properly at different compression ratios.

Instead of calculating the protection ratio by using the definition table like Table 1, an arithmetic expression such as the following Equation 1 may be used to calculate the protection ratio. In Equation 1, R represents the protection ratio, and S represents the total area of the face protection regions. For example, when S is equal to 90, R is 0.33 and the corresponding value for quantization index adjustment is "2". According to Table 1 and Equation 1, the protection ratio changes linearly with respect to the total area of the face protection regions. The relationship between the total area of the face protection regions and the protection ratio may have nonlinear characteristics that depend on the relationship between the quantization index and the quantization step in the video compressor 1.

$$R = (135 - S)/135 \qquad \text{[Equation 1]}$$

Furthermore, instead of calculating the protection ratio from the total area of the face protection regions, it may be calculated from the total area of the face regions or the total area of the enlarged face regions.

In the first embodiment, the video compressor 1 includes: (i) the DCT section 8 configured to generate frequency domain data (DCT coefficients) from an input image on a macroblock-by-macroblock basis; (ii) the quantizer 9 configured to quantize the frequency domain data; and (iii) the bit rate controller 15 configured to provide the reference quantization index $Q_0$ to the quantizer 9 so that the average bit rate of compressed data obtained from the input image falls within a predetermined range of values. Herein, the reference quantization index $Q_0$ defines a quantization step for the quantization processing to be performed by the quantizer 9. The compression ratio controller 4 gives the value for quantization index adjustment for correcting the reference quantization index $Q_0$, as the face protection instruction (compression control instruction), to the quantizer 9. The quantizer 9 uses a quantization index Q in the quantization processing to reduce the compression ratio of the face protection region. This quantization index Q is obtained by subtracting, from the reference quantization index $Q_0$, the value for quantization index adjustment given from the compression ratio controller 4. Specifically, the quantization matrix is multiplied by the quantization index Q. As described with reference to Table 1, the compression ratio controller 4 calculates the value for quantization index adjustment to be given to the quantizer 9 by multiplying the predetermined maximum value for quantization index adjustment by the protection ratio that is determined in correspondence to the ratio of the area of the face protection regions. This processing allows the protection regions and the region other than the face protection regions to be compressed properly at different compression ratios.

In the first embodiment, the compression controller 4 calculates the total area of the face protection regions included in one picture, and when the total area is large, it suppresses the degree of reduction in the compression ratio of the face protection regions. The present invention, however, is not limited to this embodiment. For example, the present embodiment may be combined with the conventional device of FIG. 13. For example, the degree of reduction in the compression ratio may be suppressed in the case where the total area of the face protection regions is large when assuming that a protection unit block consists of one macroblock. In this way, the optimum improvement in the image quality can be achieved.

Second Embodiment

The configuration of a moving image processing device in the second embodiment of the present invention is the same as that in the first embodiment of the present invention. The only difference in the operation of the device in the second embodiment is the processing performed by the compression ratio controller 4.

The operation of the device in the second embodiment is described below with a focus on that difference.

Figure 10:
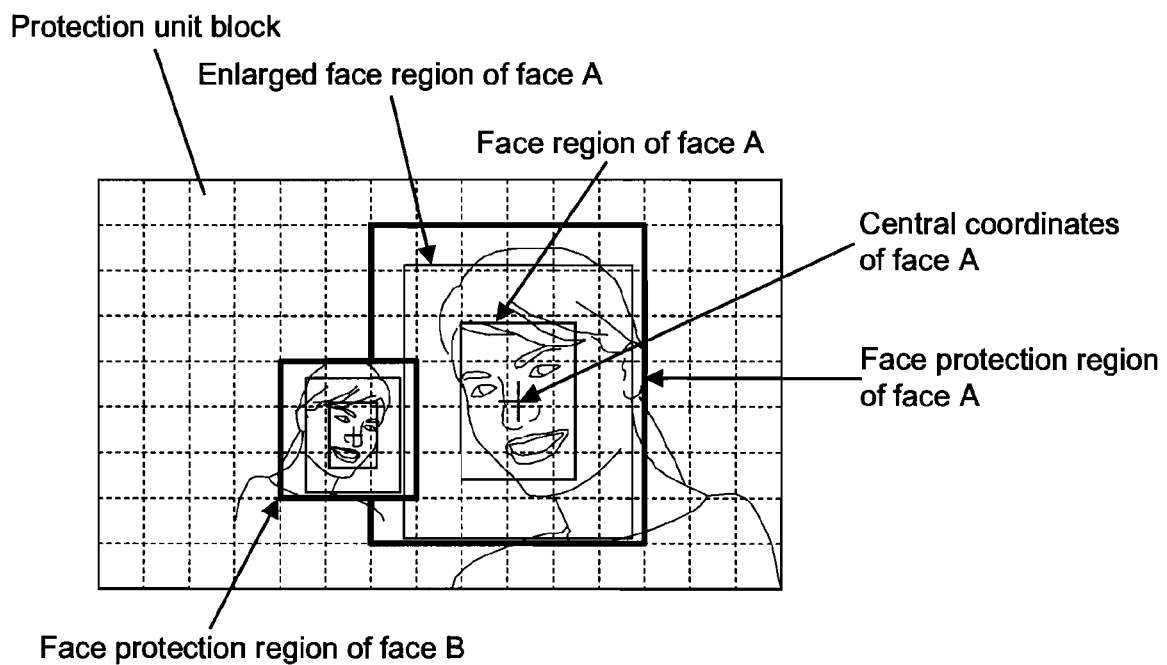
FIG. 10 is a diagram showing a relationship between an input image and face protection regions that are different in size according to a still another embodiment of the present invention.

The compression ratio controller 4 receives face detection information from the face detector 3 at the time indicated by the character C in FIG. 6, and identifies the face protection region in the same manner as in the first embodiment of the present invention. FIG. 10 shows a relationship between an input image and a plurality of face protection regions that are different from each other in size. The compression ratio controller 4 identifies the face protection region of the face A and that of the face B, and calculates individually the areas of these face protection regions. As shown in Table 2, the compression ratio controller 4 stores previously a definition table in which the relationship between the areas of the face protection regions and the corresponding maximum values for quantization index adjustment are described. That is, in the second embodiment, the maximum value for quantization index adjustment changes depending on the area of the face protection region. The compression ratio controller 4 refers to the definition table in Table 2 to determine the maximum value for quantization index adjustment for each face protection region based on the area of that region, and registers the determined value in the face protection map.

TABLE 2

|  | Area of face protection region | | | |
| --- | --- | --- | --- | --- |
|  | 1 to 16 | 17 to 32 | 33 to 64 | 65 to 135 |
| Maximum value for quantization index adjustment | 9 | 7 | 6 | 5 |

FIG. 11 is a diagram showing the structure of the face protection map in the second embodiment. The face protection map is configured to store a maximum value for quantization index adjustment as a single digit numerical value for each protection unit block. Since the area of the face protection region of the face A in the current picture is "42", the corresponding maximum value for quantization index adjustment of "6" is obtained from Table 2 and registered in the face protection region of the face A in the face protection map in FIG. 11. Since the area of the face protection region of the face B is "9", the corresponding maximum value for quantization index adjustment of "9" is obtained from Table 2 and registered in the face protection region of the face B in the face protection map. A larger maximum value for quantization index adjustment is adopted for the overlap region of a plurality of face protection regions. In the completed face protection map, the value "0" indicates the region other than the face protection regions, and the values other than "0" indicate the maximum values for quantization index adjustment.

At the same time, the compression ratio controller 4 calculates the protection ratio based on the total area of the face protection regions in the same manner as in the first embodiment. In the example of FIG. 10, since the total area of the face protection regions is "48", the protection ratio of "0.6" is obtained from Table 1. As a result of the above processing, the protection ratio of "0.6" and the maximum value for quantization index adjustment for each protection unit block are prepared shown in FIG. 11 for the input image of FIG. 10.

When the macroblock-based processing is started, the compression ratio controller 4 judges whether or not a current macroblock to be processed is included in the face protection region based on the face protection map. When such a macroblock is included in the face protection region, the compression ratio controller 4 multiplies the maximum value for quantization index adjustment for the corresponding protection unit block by a protection ratio and rounds off the obtained value. Then, the compression ratio controller 4 gives the obtained value for quantization index adjustment, as a face protection instruction, to the quantizer 9. In the case of the example of FIG. 11, it instructs the quantizer 9 to adopt the value for quantization index adjustment of "4" for the face protection region of the face A and the value for quantization index adjustment of "5" for the face protection region of the face B, respectively. According to the face protection instruction, the quantizer 9 corrects the reference quantization index $Q_0$ given from the bit rate controller 15 to set the quantization index Q. Specifically, it subtracts the given value for quantization index adjustment from the reference quantization index $Q_0$ so as to set the quantization index Q. Then, the quantizer 9 carries out the quantization processing by using the set quantization index Q. In the example of FIG. 11, the value $Q_0-4$ obtained by subtracting "4" from the reference quantization index $Q_0$ is used as the quantization index Q for quantizing the macroblocks in the face protection region of the face A. The value $Q_0-5$ obtained by subtracting "5" from the reference quantization index $Q_0$ is used as the quantization index Q for quantizing the macroblocks in the face protection region of the face B.

As described above, the image quality of the face protection regions can be improved by reducing the compression ratios thereof. In Table 2, the value for quantization index adjustment is set to a larger value for the face protection region having a smaller area. Table 2 shows clearly the operation to output a face protection instruction depending on the area of each face region so that the degree of reduction in the compression ratio is larger for the face region having a smaller area.

In the case where a face with a large area and a face with a smaller area are present in one image, viewers tend to pay more attention to the larger face, like the face A in FIG. 10. A larger face, however, has a larger area of flat portions such as cheeks and a forehead, and thus has a smaller amount of information per unit area. Therefore, compression distortion hardly occurs therein. For this reason, there is little need to reduce the compression ratio of the larger face portion to improve the image quality thereof. In addition, even if the compression ratio of the larger face portion is reduced significantly, the degree of improvement in the image quality thereof is small because this portion has less compression distortion inherently. On the other hand, the image of a smaller face portion is characterized in that it contains many high frequency components and has a larger amount of information per unit area because characteristic components such as eyes, a nose, and a mouth are crowded in a small area. Therefore, compression distortion occurs easily therein. Accordingly, noticeable degradation of the image quality tends to be observed even in the region other than the attention region, and therefore the compression ratio needs to be reduced significantly.

When an image including many small faces is compared with an image including one large face, more noticeable compression distortion is observed in the former image even if the total area of these small faces is the same as the area of the large face. It is therefore desirable to improve the quality of the image including many small faces by reducing the compression ratio thereof even further. In the second embodiment, the individual areas of face protection regions are examined, and the compression ratios are adjusted so that the degree of reduction in the compression ratio of the face protection region having a smaller area becomes larger. That is, the degree of reduction in the compression ratio of a larger face protection region with a lower need for improvement of the image quality is suppressed, while the degree of reduction in the compression ratio of a smaller face protection region with a higher need for improvement of the image quality is increased. In this way, the optimum image quality can be achieved for various sizes of faces while reducing the inefficiency in the bit rate.

How much compression distortion occurs and how noticeable the distortion is depend on the size of a face. In the above-mentioned conventional moving image processing device, a plurality of face protection regions are protected uniformly. Therefore, there is a problem that the quality of the individual face images cannot be improved properly.

In the second embodiment, in the case where an input image includes a plurality of face protection regions, the compression ratio controller 4 examines the individual areas of the face protection regions. Then, the compression ratio controller 4 generates a plurality of compression control instructions corresponding individually to the face protection regions so that the degree of reduction in the compression ratio of the face protection region having a relatively small area is large and so that the degree of reduction in the compression ratio of the face protection region having a relatively large area is small. Specifically, the compression ratio controller 4 generates the compression control instructions suitable for the individual face protection regions based on the ratio of the total area of the plurality of the face protection regions to the entire area of the input image and on the individual areas of the face protection regions. As a result, even when a picture includes a plurality of faces having different areas, the quality of the individual face images can be improved properly.

In addition, as shown in Table 2, in the case where an input image includes a plurality of face protection regions, a plurality of maximum values for quantization index adjustment are prepared in correspondence to the areas of the face protection regions so that the degree of reduction in the compression ratio of the face protection region having a relatively small area is large and so that the degree of reduction in the compression ratio of the face protection region having a relatively large area is small. Also with this configuration, the quality of the individual face images can be improved properly depending on the sizes (areas) of the faces.

In the case where the input image includes the plurality of the face protection regions having different areas and the face protection region having a large area overlaps the face protection region having a small area, the maximum value for quantization index adjustment for the face protection region having the small area is used as the maximum value for quantization index adjustment for the overlap region. Accordingly, even when a large face region overlaps a small face region, the quality of the individual face images can be improved properly depending on the sizes (areas) of the faces. The maximum value for quantization index adjustment shown in Table 2 may, of course, be used as a degree of reduction in the quantization index without any modification. That is, an embodiment, in which even if a plurality of face protection regions are present, the total area of these regions is not considered, can also be employed suitably.

In the second embodiment, the compression ratio controller 4 examines the individual areas of the face protection regions included in the input image, and outputs the face protection instruction so that the degree of reduction in the compression ratio of the face protection region having a smaller area becomes larger. The present invention, however, is not limited to this embodiment. For example, the compression ratio controller 4 in the first embodiment may examine the individual areas of the face protection regions included in the input image to output a face protection instruction so that the degree of reduction in the compression ratio of the face protection region having a smaller area becomes larger. Furthermore, it may examine the areas of the face protection regions on a macroblock-by-macroblock basis, as in the conventional device, to perform the quantization processing so that the degree of reduction in the compression ratio of the face protection region having a smaller area becomes larger.

The definition table shown in Table 1 may be combined with the definition table shown in Table 2 to implement the second embodiment with a single combined definition table. As described in the first embodiment, a calculation formula may be prepared to calculate values for quantization index adjustment.

The first and second embodiments have described the case where a person's face is detected as a specific target. The present invention, however, is not limited to this case. For example, an animal, a moving object, or the like may be detected as a specific target to perform the compression control described in the first and second embodiments for the specific target. Furthermore, as an alternative specific target detection technique to an object detection technique, a technique to detect a specific target based on its characteristic color information, average luminance, etc. may be employed.

(Embodiment of Imaging Apparatus)

Figure 12:
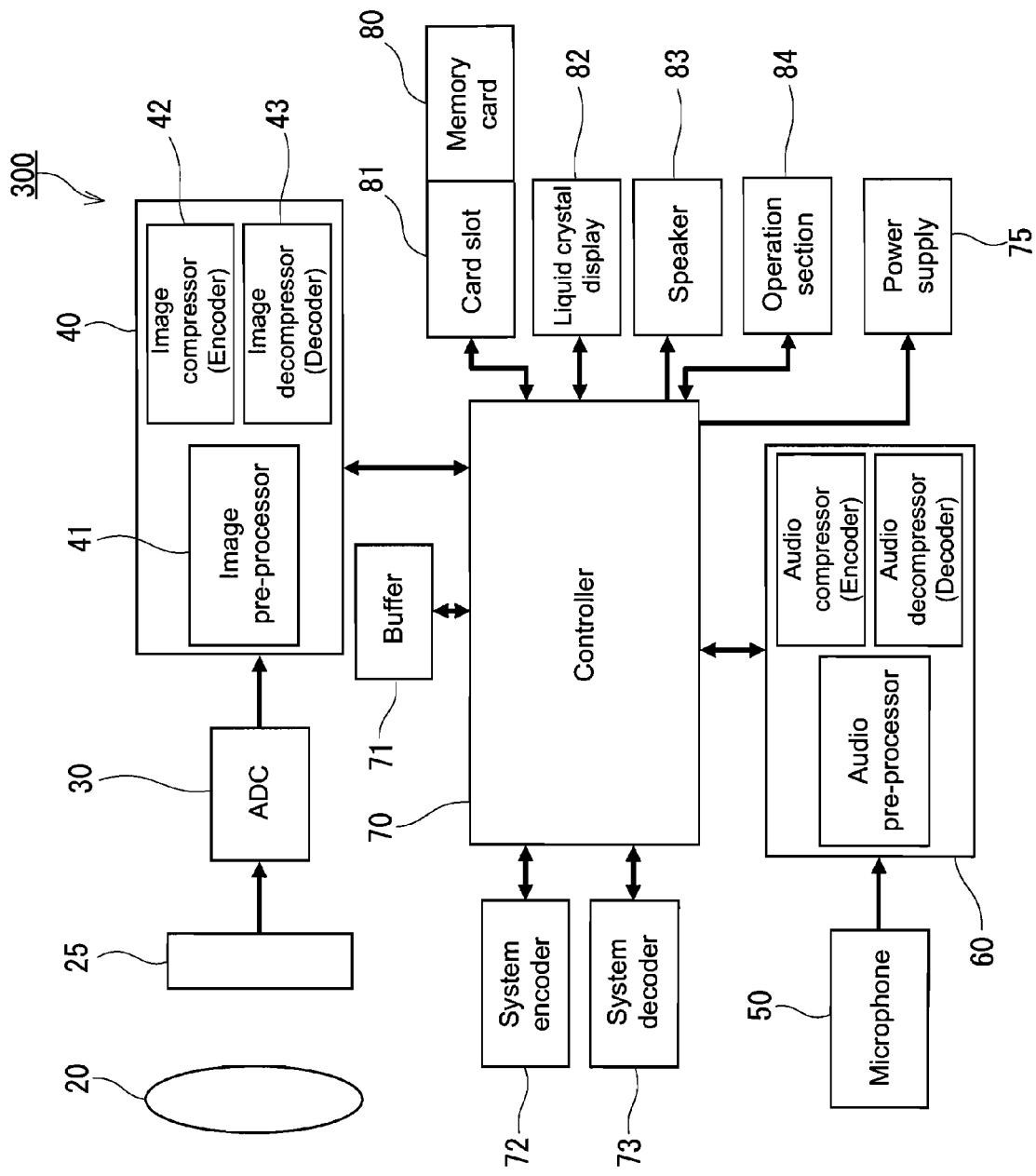
FIG. 12 is a block diagram showing a configuration of a video camera using the moving image processing device described in each of the first and second embodiments.

FIG. 12 is a block diagram showing a typical configuration of a video camera. A video camera 300 includes, for example, an optical system 20, an imaging device 25, an ADC (analog-digital converter) 30, an image processor 40, a controller 70, a buffer 71, a microphone 50, an audio processor 60, a system encoder 72, a system decoder 73, a card slot 81, a liquid crystal display 82, a speaker 83, an operation section 84, and a power supply 75. The optical system 20 and the imaging device 25 constitute an imaging sensor that captures an image of a subject. The image processor 40 includes an image pre-processor 41, an image compressor 42, and an image decompressor 43. The ADC 30 and the image pre-processor 41 constitute an image generator that processes the output of the imaging sensor to generate the processed image data. Specifically, the image generator performs various image processings, such as a gamma correction and a white balance correction, on a digital image signal converted from an analog image signal by the ADC 30 so as to generate the processed image data. The image compressor 40 receives, as input image data, the image data generated by the image pre-processor 41 as the image generator, and compresses and encodes the received input image data to generate compressed data. The compressed data is stored in a storage device such as a memory card 80 inserted into the card slot 81. The image compressor 40 in FIG. 12 can be constituted of the moving image processing device described in the first and second embodiments.

According to the moving image processing device described in the present specification, since the input image is partitioned into protection unit blocks for management, macroblock-based processing can be achieved in a very simple manner. The introduction of the enlarged face region allows the image quality not only of the face image but also of even the region adjacent to the face to be improved. Even if the face region is displaced from the actual face position, the quality of the face image can be improved. In addition, since the degree of reduction in the compression ratio is controlled based on the total area of face protection regions, a portion with poor image quality is hardly visible in the picture even when the area of the face protection region is large. Furthermore, since the degree of reduction in the compression ratio of an image including a plurality of faces is controlled individually based on the individual areas of the face protection regions, the image quality of the individual face protection regions can be improved properly. Accordingly, the present invention can be applied advantageously to imaging apparatuses such as digital video recorders and digital video cameras that compress moving images and record the compressed image data.

The invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A moving image processing device comprising:
a specific target detector configured to detect, as a specific target region, a region including a specific target in an input image;
a video compressor capable of compressing the input image while changing a compression ratio according to each position in the input image; and
a compression ratio controller configured to output, to the video compressor, a compression control instruction for reducing the compression ratio of the specific target region detected by the specific target detector so that a degree of reduction in the compression ratio of the specific target region is small in the case where a ratio of an area of the specific target region to an entire area of the input image is relatively large and so that the degree of reduction in the compression ratio of the specific target region is large in the case where the ratio of the area of the specific target region to the entire area of the input image is relatively small.

2. The moving image processing device according to claim 1, wherein
the video compressor is capable of compressing the input image while changing the compression ratio on a macroblock-by-macroblock basis by quantizing the input image on the macroblock-by-macroblock basis, and
the compression ratio controller partitions the input image into a plurality of protection unit blocks each consisting of the macroblocks, and outputs the compression control instruction to the video compressor to reduce the compression ratio of the protection unit block including the specific target region detected by the specific target detector.

3. The moving image processing device according to claim 2, wherein the compression ratio controller extracts an enlarged specific target region obtained by enlarging the specific target region, and outputs the compression control instruction to the video compressor to reduce the compression ratio of the protection unit block including the enlarged specific target region.

4. The moving image processing device according to claim 1, wherein the compression ratio controller increases the degree of reduction in the compression ratio of the specific target region in a stepwise manner as the ratio of the area of the specific target region to the entire area of the input image becomes smaller.

5. The moving image processing device according to claim 1, wherein in the case where the input image includes a plurality of the specific target regions, the compression ratio controller generates the compression control instruction based on a ratio of a total area of the plurality of the specific target regions to the entire area of the input image.

6. The moving image processing device according to claim 1, wherein in the case where the input image includes a plurality of the specific target regions, the compression ratio controller examines individual areas of the plurality of the specific target regions, and generates a plurality of the compression control instructions corresponding individually to the specific target regions so that the degree of reduction in the compression ratio of the specific target region having a relatively small area is large and so that the degree of reduction in the compression ratio of the specific target region having a relatively large area is small.

7. The moving image processing device according to claim 6, wherein the compression ratio controller generates the compression control instructions corresponding individually to the specific target regions based on a ratio of a total area of the plurality of the specific target regions to the entire area of the input image and on the individual areas of the specific target regions.

8. The moving image processing device according to claim 1, wherein
the video compressor includes: (i) a DCT section configured to generate frequency domain data from the input image on a macroblock-by-macroblock basis; (ii) a quantizer configured to quantize the frequency domain data; and (iii) a bit rate controller configured to provide a reference quantization index to the quantizer so that an average bit rate of compressed data obtained from the input image falls within a predetermined range of values, the reference quantization index defining a quantization step for a quantization processing to be performed by the quantizer,
the compression ratio controller gives a value for quantization index adjustment for correcting the reference quantization index, as the compression control instruction, to the quantizer, and
the quantizer uses a quantization index in the quantization processing to reduce the compression ratio of the specific target region, the quantization index being obtained by subtracting, from the reference quantization index, the value for quantization index adjustment given from the compression ratio controller.

9. The moving image processing device according to claim 8, wherein the compression ratio controller calculates the value for quantization index adjustment to be given to the quantizer by multiplying a predetermined maximum value for quantization index adjustment by a protection ratio that is determined in correspondence to the ratio of the area of the specific target region.

10. The moving image processing device according to claim 9, wherein in the case where the input image includes a plurality of the specific target regions, a plurality of the maximum values for quantization index adjustment are prepared in correspondence to the areas of the specific target regions so that the degree of reduction in the compression ratio of the specific target region having a relatively small area is large and so that the degree of reduction in the compression ratio of the specific target region having a relatively large area is small.

11. The moving image processing device according to claim 10, wherein in the case where the input image includes the plurality of the specific target regions having different areas and the specific target region having a large area overlaps the specific target region having a small area, the maximum value for quantization index adjustment for the specific target region having the small area is used as the maximum value for quantization index adjustment for the overlap region.

12. The moving image processing device according to claim 1, wherein the specific target detector detects a face object included in the input image and extracts a face detection region as the specific target region.

13. A moving image processing method comprising:
a specific target detection step of detecting, as a specific target region, a region including a specific target in an input image;
a compression ratio control step of generating and outputting a compression control instruction for reducing a compression ratio of the specific target region detected in the specific target detection step so that a degree of reduction in the compression ratio of the specific target region is small in the case where a ratio of an area of the specific target region to an entire area of the input image is relatively large and so that the degree of reduction in the compression ratio of the specific target region is large in the case where the ratio of the area of the specific target region to the entire area of the input image is relatively small; and a video compression step of performing a compression processing of the specific target region according to the compression control instruction generated in the compression ratio control step.

14. An imaging apparatus comprising:

an image sensor configured to capture an image of a subject;

an image generator configured to process an output of the image sensor to generate processed image data; and a moving image processing device according to claim 1 configured to receive, as input image data, the image data generated by the image generator, and generates compressed data from the received input image data.

* * * * *